(12) United States Patent
Strother

(10) Patent No.: US 8,920,893 B2
(45) Date of Patent: Dec. 30, 2014

(54) ARTICLE WITH AN INTERNAL STRUCTURE

(75) Inventor: Oliver M. Strother, Leeds (GB)

(73) Assignee: Rolls-Royce PLC, London (GB)

( * ) Notice: Subject to any disclaimer, the term of this patent is extended or adjusted under 35 U.S.C. 154(b) by 655 days.

(21) Appl. No.: 12/654,211

(22) Filed: Dec. 14, 2009

(65) Prior Publication Data

US 2010/0189933 A1    Jul. 29, 2010

(30) Foreign Application Priority Data

Jan. 27, 2009 (GB) .................................. 0901235.2

(51) Int. Cl.
| | | |
|---|---|---|
| B32B 1/06 | (2006.01) | |
| F01D 5/16 | (2006.01) | |
| B21D 26/055 | (2011.01) | |
| B21D 53/78 | (2006.01) | |
| B23P 15/04 | (2006.01) | |
| F04D 29/02 | (2006.01) | |
| F04D 29/32 | (2006.01) | |
| F04D 29/66 | (2006.01) | |

(52) U.S. Cl.
CPC ................ F01D 5/16 (2013.01); B21D 26/055 (2013.01); B21D 53/78 (2013.01); B23P 15/04 (2013.01); F04D 29/023 (2013.01); F04D 29/324 (2013.01); F04D 29/668 (2013.01); Y10S 416/50 (2013.01)
USPC ........ 428/35.8; 428/34.1; 428/35.7; 428/544; 428/615; 416/500

(58) Field of Classification Search
CPC ........ B21D 26/055; B21D 53/78; F01D 5/12; B23P 15/04; F04D 29/324; B29D 53/045
USPC ........... 244/123.1, 123.12, 123, 123.4, 123.5, 244/123.8, 53 R; 416/233, 500, 232; 52/796.12, 797.1, 782.1, 784.14, 52/784.15, 784.16; 415/119, 136; 428/34.1, 116, 119, 183, 186, 598, 428/614, 680, 683, 685, 586, 593, 925
See application file for complete search history.

(56) References Cited

U.S. PATENT DOCUMENTS

| | | | |
|---|---|---|---|
| 2,202,014 A | 5/1940 | Lougheed | |
| 3,111,747 A | 11/1963 | Johnson | |

(Continued)

FOREIGN PATENT DOCUMENTS

| | | |
|---|---|---|
| EP | 0 130 583 A2 | 1/1985 |
| EP | 0 181 203 A2 | 5/1986 |

(Continued)

OTHER PUBLICATIONS

British Search Report conducted May 5, 2009 in corresponding British Patent Application No. GB0901235.2.

(Continued)

Primary Examiner — Erik Kashnikow
Assistant Examiner — Lee Sanderson
(74) Attorney, Agent, or Firm — Oliff PLC

(57) ABSTRACT

An aerofoil has first and second panels spaced apart from each other to provide a cavity, the cavity containing a damping material, the first panel has at least one protrusion extending therefrom within the cavity towards the second panel, the protrusion having a proximal end and a distal end, wherein the proximal end is secured to the first panel and the distal end is slidably mounted to the second panel.

17 Claims, 5 Drawing Sheets

(56) References Cited

U.S. PATENT DOCUMENTS

| | | |
|---|---|---|
| 3,736,638 A | 6/1973 | Stone, Jr. |
| 3,927,817 A | 12/1975 | Hamilton et al. |
| 4,217,397 A | 8/1980 | Hayase et al. |
| 4,292,375 A | 9/1981 | Ko |
| 4,304,821 A | 12/1981 | Hayase et al. |
| 4,331,284 A | 5/1982 | Schulz et al. |
| 4,522,860 A | 6/1985 | Scott et al. |
| 4,530,197 A | 7/1985 | Rainville |
| 4,583,914 A | 4/1986 | Craig et al. |
| 4,642,863 A | 2/1987 | Schulz |
| 4,655,014 A | 4/1987 | Krecke |
| 4,811,890 A | 3/1989 | Dowling et al. |
| 4,882,823 A | 11/1989 | Weisert et al. |
| 5,007,225 A | 4/1991 | Teasdale |
| 5,119,531 A * | 6/1992 | Berger et al. ............... 24/586.1 |
| 5,143,276 A | 9/1992 | Mansbridge et al. |
| 5,240,376 A | 8/1993 | Velicki |
| 5,243,758 A | 9/1993 | LeMonds et al. |
| 5,253,419 A | 10/1993 | Collot et al. |
| 5,323,953 A | 6/1994 | Adderley et al. |
| 5,330,092 A | 7/1994 | Gregg et al. |
| 5,384,959 A | 1/1995 | Velicki |
| 5,419,039 A | 5/1995 | Auxier et al. |
| 5,469,618 A | 11/1995 | LeMonds et al. |
| 5,534,354 A | 7/1996 | Gregg et al. |
| 5,544,805 A | 8/1996 | Alassoeur et al. |
| 5,570,552 A | 11/1996 | Nehring |
| 5,692,881 A | 12/1997 | Leibrfied |
| 5,723,225 A | 3/1998 | Yasui et al. |
| 5,821,506 A | 10/1998 | Matsen |
| 5,826,332 A | 10/1998 | Bichon et al. |
| 5,881,459 A | 3/1999 | Yasui |
| 5,941,446 A | 8/1999 | Yasui |
| 6,039,542 A | 3/2000 | Schilling et al. |
| 6,139,278 A | 10/2000 | Mowbray et al. |
| 6,224,341 B1 | 5/2001 | Fricke |
| 6,287,080 B1 | 9/2001 | Evans et al. |
| 6,331,217 B1 | 12/2001 | Burke et al. |
| 6,419,146 B1 | 7/2002 | Buldhaupt et al. |
| 6,467,168 B2 | 10/2002 | Wallis |
| 6,669,447 B2 * | 12/2003 | Norris et al. ................ 416/224 |
| 6,720,087 B2 | 4/2004 | Fried et al. |
| 6,893,211 B1 | 5/2005 | Eibl et al. |
| 6,979,180 B2 | 12/2005 | Motherwell |
| 6,986,940 B1 * | 1/2006 | Carper ....................... 428/292.1 |
| 7,025,568 B2 | 4/2006 | Jones |
| 7,070,390 B2 | 7/2006 | Powell |
| 7,144,222 B2 | 12/2006 | Lanni et al. |
| 7,247,003 B2 | 7/2007 | Burke et al. |
| 7,311,500 B2 | 12/2007 | Rongong et al. |
| 7,406,849 B2 | 8/2008 | Ueno et al. |
| 7,431,197 B2 | 10/2008 | Franchet et al. |
| 7,470,114 B2 | 12/2008 | Bonnet |
| 7,753,654 B2 | 7/2010 | Read et al. |
| 8,382,441 B2 | 2/2013 | Brennand et al. |
| 2002/0014101 A1 | 2/2002 | Yajima |
| 2003/0136815 A1 | 7/2003 | Debaisieux et al. |
| 2003/0156942 A1 | 8/2003 | Villhard |
| 2003/0164255 A1 | 9/2003 | Borroni-Bird et al. |
| 2004/0018091 A1 | 1/2004 | Rongong et al. |
| 2004/0191069 A1 | 9/2004 | Motherwell |
| 2006/0066133 A1 | 3/2006 | Ueno et al. |
| 2006/0255098 A1 | 11/2006 | Runyan |
| 2007/0065291 A1 | 3/2007 | Karafillis |
| 2007/0243070 A1 | 10/2007 | Matheny |
| 2007/0243408 A1 | 10/2007 | Straza |
| 2008/0025846 A1 * | 1/2008 | Vance et al. ................ 416/233 |
| 2008/0260538 A1 * | 10/2008 | Wilson et al. ............... 416/97 R |
| 2009/0057488 A1 * | 3/2009 | Goldfinch et al. ....... 244/123.14 |
| 2009/0057489 A1 | 3/2009 | Goldfinch et al. |
| 2009/0057718 A1 | 3/2009 | Suvorov et al. |
| 2009/0060718 A1 | 3/2009 | Goldfinch et al. |
| 2009/0304517 A1 | 12/2009 | Strother |
| 2010/0021693 A1 | 1/2010 | Goldfinch et al. |
| 2010/0040479 A1 * | 2/2010 | Spangler et al. ............ 416/97 R |
| 2010/0186215 A1 | 7/2010 | Jones et al. |

FOREIGN PATENT DOCUMENTS

| | | |
|---|---|---|
| EP | 0 209 867 A2 | 1/1987 |
| EP | 0 358 523 A1 | 3/1990 |
| EP | 0 418 179 A1 | 3/1991 |
| EP | 0 469 221 A1 | 2/1992 |
| EP | 0 354 631 B1 | 6/1992 |
| EP | 0 500 458 A1 | 8/1992 |
| EP | 0 520 827 A2 | 12/1992 |
| EP | 0 527 564 A1 | 2/1993 |
| EP | 0 549 172 A1 | 6/1993 |
| EP | 0 555 534 A2 | 8/1993 |
| EP | 0 582 795 A1 | 2/1994 |
| EP | 0 594 885 A1 | 5/1994 |
| EP | 0 765 711 A1 | 4/1997 |
| EP | 0 716 273 B1 | 3/1998 |
| EP | 0 926 312 A2 | 6/1999 |
| EP | 1 013 355 A2 | 6/2000 |
| EP | 1 085 288 A1 | 3/2001 |
| EP | 0 594 886 B1 | 7/2001 |
| EP | 1 160 752 A1 | 12/2001 |
| EP | 1 184 768 A2 | 3/2002 |
| EP | 1 024 330 B1 | 11/2002 |
| EP | 0 886 813 B1 | 1/2003 |
| EP | 1 327 489 A1 | 7/2003 |
| EP | 1 355 212 A1 | 10/2003 |
| EP | 1 433 993 A1 | 6/2004 |
| EP | 1 460 347 A1 | 9/2004 |
| EP | 1 460 507 A2 | 9/2004 |
| EP | 1 466 692 A1 | 10/2004 |
| EP | 1 491 980 A2 | 12/2004 |
| EP | 1 541 953 A1 | 6/2005 |
| EP | 1 561 901 A2 | 8/2005 |
| EP | 1 160 640 B1 | 2/2006 |
| EP | 1 653 165 A1 | 5/2006 |
| EP | 1 811 129 A2 | 7/2007 |
| EP | 2 014 384 A1 | 1/2009 |
| EP | 2 014 386 A1 | 1/2009 |
| EP | 2 014 387 A1 | 1/2009 |
| EP | 2 014 388 A1 | 1/2009 |
| EP | 2 014 869 A1 | 1/2009 |
| EP | 2 119 871 A2 | 11/2009 |
| EP | 2 147 731 A1 | 1/2010 |
| EP | 2 223 766 A1 | 9/2010 |
| GB | 842937 A | 7/1960 |
| GB | 1 367 958 A | 9/1974 |
| GB | 1 437 510 A | 5/1976 |
| GB | 2 124 520 A | 2/1984 |
| GB | 2 154 287 A | 9/1985 |
| GB | 1 284 867 A | 7/1987 |
| GB | 2 193 306 A | 2/1988 |
| GB | 2 198 264 A | 6/1988 |
| GB | 2 202 619 A | 9/1988 |
| GB | 2 206 685 A | 1/1989 |
| GB | 2 211 593 A | 7/1989 |
| GB | 2 228 069 A | 8/1990 |
| GB | 2 249 615 A | 5/1992 |
| GB | 2 251 063 A | 6/1992 |
| GB | 2 261 032 A | 5/1993 |
| GB | 2 298 265 A | 8/1996 |
| GB | 2 305 720 A | 4/1997 |
| GB | 2 360 070 A | 9/2001 |
| GB | 2 371 095 A | 7/2002 |
| GB | 2 387 669 A | 10/2003 |
| GB | 2 391 270 A | 2/2004 |
| GB | 2 393 498 A | 3/2004 |
| GB | 2 397 855 A | 8/2004 |
| GB | 2 401 407 A | 11/2004 |
| GB | 2 402 716 A | 12/2004 |
| GB | 2 408 295 A | 5/2005 |
| GB | 2 411 462 A | 8/2005 |
| GB | 2 416 228 A | 1/2006 |
| GB | 2 438 185 A | 11/2007 |
| GB | 2 450 934 A | 1/2009 |
| GB | 2 450 935 A | 1/2009 |

(56) References Cited

FOREIGN PATENT DOCUMENTS

| | | |
|---|---|---|
| JP | A-2008-133825 | 6/2008 |
| WO | WO 97/27045 A2 | 7/1997 |
| WO | WO 00/70271 A1 | 11/2000 |
| WO | WO 01/56332 A1 | 8/2001 |
| WO | WO 01/82018 A2 | 11/2001 |
| WO | WO 02/48615 A2 | 6/2002 |
| WO | WO 03/025469 A1 | 3/2003 |
| WO | WO 03/042607 A1 | 5/2003 |
| WO | WO 03/093916 A2 | 11/2003 |
| WO | WO 2004/102077 A1 | 11/2004 |
| WO | WO 2005/022953 A1 | 3/2005 |
| WO | WO 2005/045326 A1 | 5/2005 |
| WO | WO 2005/067619 A2 | 7/2005 |
| WO | WO 2005/069820 A2 | 8/2005 |
| WO | WO 2005/071510 A1 | 8/2005 |

OTHER PUBLICATIONS

Mar. 7, 2012 Office Action issued in U.S. Appl. No. 12/453,435.
Mar. 12, 2012 Notice of Allowance issued in U.S. Appl. No. 12/216,503.
Mar. 20, 2012 Office Action issued in U.S. Appl. No. 12/216,505.
Apr. 16, 2012 Office Action issued in U.S. Appl. No. 12/216,502.
May 19, 2010 European Search Report issued in corresponding European Patent Application No. 09252779.5.
Jun. 29, 2012 Office Action issued in U.S. Appl. No. 12/654,504.
Sep. 6, 2012 Office Action issued in U.S. Appl. No. 12/216,505.
Sep. 2, 2009 European Search Report issued in European Application No. 09 25 1341.
Dec. 14, 2010 Search Report issued in British Application No. GB1020063.2.
Jul. 28, 2009 Search Report issued in British Patent Application No. 0907004.6.
Jul. 27, 2010 Search Report issued in European Patent Application No. EP 10 15 7495.2.
Jan. 19, 2010 Search Report issued in British Patent Application No. 0916687.7.
Mar. 18, 2009 British Search Report issued in British Patent Application No. GB0901318.6.
Oct. 7, 2008 European Search Report issued in European Patent Application No. 08 01 1077.
Oct. 20, 2008 European Search Report issued in European Patent Application No. 08 01 1078.
Oct. 21, 2008 European Search Report issued in European Patent Application No. 08 01 1079.
Dec. 7, 2010 Search Report issued in British Application No. GB1013305.6.
Sep. 2, 2010 Search Report issued in British Application No. GB1009216.1.
Sep. 15, 2009 Search Report issued in British Application No. GB0911416.6.
May 11, 2011 Partial European Search Report issued in European Application No. 10 16 5255.
Sep. 22, 2008 Search Report issued in British Application No. GB0808840.3.
Aug. 28, 2007 Search Report issued in British Application No. GB0713700.3.
Sep. 16, 2008 Search Report issued in British Application No. GB0813539.4.
Mar. 7, 2008 Search Report issued in British Application No. GB0713699.7.
Oct. 12, 2007 Search Report issued in British Application No. GB0713699.7.
Jul. 26, 2011 Office Action issued in U.S. Appl. No. 12/453,762.
Sep. 12, 2011 Office Action issued in U.S. Appl. No. 12/453,762.
Dec. 21, 2011 Notice of Allowance issued in U.S. Appl. No. 12/453,762.
Jul. 1, 2011 Office Action issued in U.S. Appl. No. 12/216,503.
Dec. 27, 2011 Notice of Allowance issued in U.S. Appl. No. 12/216,503.
Sep. 26, 2011 Office Action issued in U.S. Appl. No. 12/453,435.
Feb. 25, 2011 Office Action issued in U.S. Appl. No. 12/216,505.
Jun. 2, 2011 Office Action issued in U.S. Appl. No. 12/216,505.
Nov. 23, 2011 Office Action issued in U.S. Appl. No. 12/216,505.
Feb. 3, 2011 Office Action issued in U.S. Appl. No. 12/216,497.
Jul. 20, 2011 Office Action issued in U.S. Appl. No. 12/216,497.
Mar. 9, 2011 Notice of Allowance issued in U.S. Appl. No. 12/216,502.
Dec. 6, 2010 Office Action issued in U.S. Appl. No. 12/216,502.
U.S. Appl. No. 13/299,671 in the name of Strother, filed Nov. 18, 2011.
U.S. Appl. No. 12/654,504 in the name of Jones et al., filed Dec. 22, 2009.
U.S. Appl. No. 12/844,215 in the name of Harron, filed Jul. 27, 2010.
U.S. Appl. No. 12/730,641 in the name of Strother, filed Mar. 24, 2010.
U.S. Appl. No. 12/216,503 in the name of Goldfinch et al, filed Jul. 7, 2008.
U.S. Appl. No. 13/186,850 in the name of Goldfinch et al, filed Jul. 20, 2011.
U.S. Appl. No. 13/114,382 in the name of Strother, filed May 24, 2010.
U.S. Appl. No. 12/453,762 in the name of Goldfinch, filed May 21, 2009.
U.S. Appl. No. 12/216,505 in the name of Strother, filed Jul. 7, 2008.
U.S. Appl. No. 12/453,435 in the name of Strother, filed May 11, 2009.
U.S. Appl. No. 12/796,231 in the name of Mason, filed Jun. 8, 2010.
U.S. Appl. No. 13/008,323 in the name of Strother, filed Jan. 18, 2011.
U.S. Appl. No. 12/720,253 in the name of Strother, filed Mar. 9, 2010.
U.S. Appl. No. 12/720,351 in the name of Strother, filed Mar. 9, 2010.
U.S. Appl. No. 12/216,502 in the name of Goldfinch et al., filed Jul. 7, 2008.
U.S. Appl. No. 12/216,497 in the name of Goldfinch et al., filed Jul. 7, 2008.
Jun. 20, 2013 Office Action issued in U.S. Appl. No. 12/730,641.
Jul. 9, 2013 Notice of Allowance issued in U.S. Appl. No. 12/453,762.
Office Action issued in U.S. Appl. No. 12/216,505 dated Feb. 21, 2013.
Oct. 10, 2013 Office Action issued in U.S. Appl. No. 12/216,505.
Dec. 2, 2013 Office Action issued in U.S. Appl. No. 12/730,641.
Aug. 21, 2013 Office Action issued in U.S. Appl. No. 12/796,231.
Feb. 10, 2014 Office Action issued in U.S. Appl. No. 13/186,850.
Dec. 6, 2013 Search Report issued in European Patent Application No. EP 11 17 4688.
Sep. 16, 2013 European Search Report issued in European Patent Application No. EP 10 17 0940.
Jun. 18, 2014 Office Action issued in U.S. Appl. No. 13/186,850.
Jul. 14, 2014 Notice of Allowance issued in U.S. Appl. No. 12/216,497.

* cited by examiner

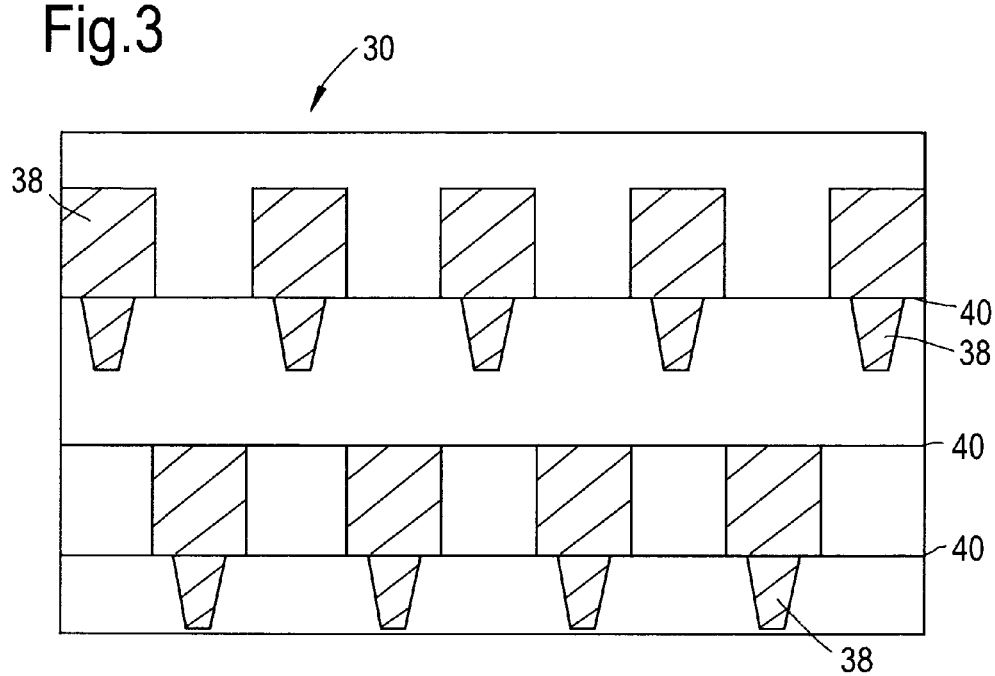
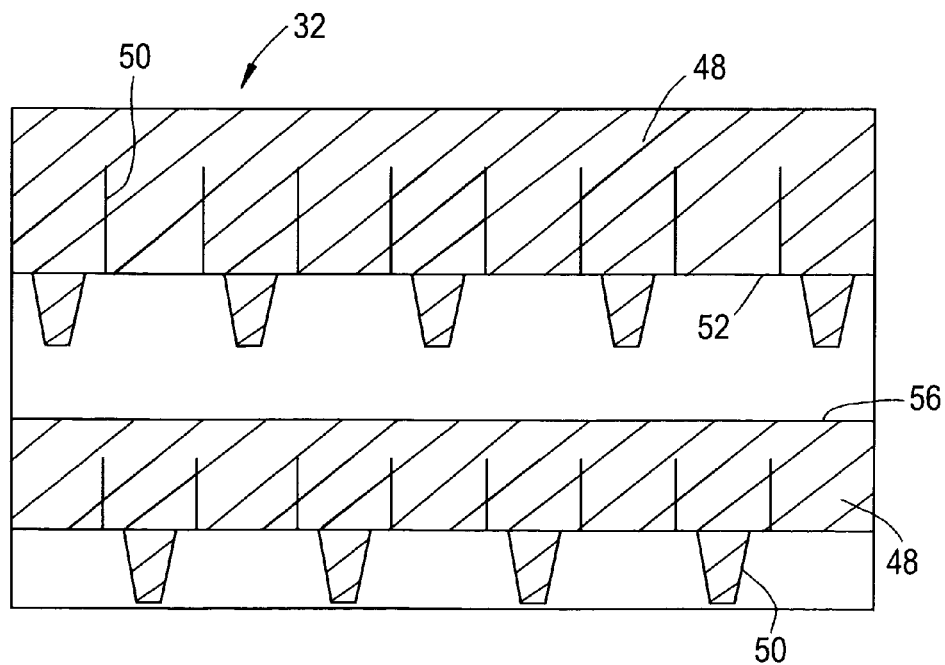

ARTICLE WITH AN INTERNAL STRUCTURE

This invention relates to an article with an internal structure which may also have a damping filler. The invention is particularly, although not exclusively, useful where the article is a rotatable article such as a blade for use in a gas turbine engine.

It is known to use hollow aerofoils on gas turbine engine fan blades. The hollow aerofoil is typically formed by inflating a blade pre-cursor at a temperature where the blade exhibits superplasticity and is often provided with a rigid internal metallic structure to increase strength and prevent so called panting of the walls of the aerofoil i.e. movement towards and away from each other.

It has been found that rigid structures can transmit vibrations across the blade that increase the modal response of the blade which ultimately, in severe cases, can lead to failure of the blade earlier in its lifetime than desired.

To facilitate damping and reduce vibration of the component the hollow cavity can be filled with a damping material. The damping material should be capable of resisting shear loading at the operating temperature of the article. A particularly useful, but still exemplary damping material is a viscoelastic material. In GB2450934 a blade is provided which has discreet internal ribs attached to the opposing walls. The ribs serve to retain the visco-elastic material without compromising damping.

The rheostatic nature of visco-elastic materials results in a tendency to flow when loaded in tension. For rotating aerofoils there is a requirement to retain the damping material during running to prevent, or at least resist movement of the damping media during operation of the engine.

There is also a requirement to simplify the manufacture of hollow blades with visco-elastic material retaining structures.

It is an object of the present invention to seek to address these and other problems.

According to a first aspect of the invention there is provided an article having first and second panels spaced apart from each other to provide a cavity, the first panel having at least one protrusion extending therefrom within the cavity towards the second panel, characterised in that the protrusion has a proximal end and a distal end, wherein the proximal end is secured to the first panel and the distal end is slidably secured in a pocket in the second panel.

The first panel may comprise a laminate of an exterior wall and at least one interior membrane leaf, wherein the proximal end of the protrusion is integral with the interior membrane leaf(s).

The second panel may comprise a laminate of an exterior wall and at least one interior membrane leaf, wherein the pocket is provided between the exterior wall and at least one of the interior membrane leafs.

Preferably the membrane leafs are arranged as a laminate having outer surfaces wherein each outer surface is rigidly attached to either the first panel or the second panel at one or more regions thereof.

The protrusions may be bowed. The distal end of the protrusion may be tapered.

The first and second panels may be shaped to present a profile that generates lift from a fluid flowing past the article. The article may be an aerofoil or hydrofoil.

The cavity may contain a damping material, which may be a viscoelastic damping material.

The article may comprise a plurality of protrusions arranged as at least one array wherein the direction in which each array extends provides a barrier for inhibiting the passage of damping material in use when the cavity contains such material.

The second panel may comprise a laminate of an exterior wall and at least one interior membrane, wherein the distal end of the protrusion is slidably mounted between the exterior wall and the interior membrane.

The at least one protrusion may be slanted between the first and second panels.

Preferably, at least some damping function is afforded by the contact sliding of the at least one protrusion on the second panel in addition to damping afforded by flexing of the viscoelastic material.

If the article is exposed to centrifugal loads, preferably the direction of slant is opposite to the direction the damping material is moved under the centrifugal load in use. The article may comprise a plurality of protrusions arranged as an array wherein the direction in which the array extends is perpendicular to the direction of slant. Each array may be spaced from an adjacent array in the direction of slant of the protrusions.

There may also be provided an article having first and second panels spaced apart from each other to provide a cavity, the cavity containing a damping material the first panel having at least one protrusion extending therefrom within the cavity towards the second panel, the protrusion having a proximal end and a distal end, wherein the proximal end is secured to the first panel and the distal end is slidably mounted to the second panel.

According to a second aspect there is provided a method of manufacturing an article, the method comprising the steps of providing first and second panels, the first and second panels being secured together as a unit, wherein the first and second panels are separated to provide a cavity and a protrusion having a proximal end and a distal end, wherein the proximal end is secured to the first panel and the distal end is slidably secured in a pocket provided in the second panel.

The unit may comprise a laminate of n membrane leafs where n>=2 between the first and second panels the membranes leafs being cut and having an application of stop-off material for preventing the adhesion of the membranes to the panels and each other at selected locations, wherein the protrusion is provided by a portion of n-x of the membrane leafs where x<=n-1.

The laminate may have outer surfaces wherein each outer surface is rigidly attached to either the first panel or the second panel at one or more regions thereof.

Preferably the first and second panels are moved apart following assembly into a unit.

The first and second panels may be assembled into a unit by a process of diffusion bonding.

Preferably the panels are moved apart by inserting a gas at high pressure therebetween to inflate the article.

Preferably the method further comprising the step of injecting a viscoelastic damping material into the cavity.

There may also be provided a method of manufacturing an article, the method comprising the steps of providing first and second panels, the first and second panels being secured together as a unit, wherein the first and second panels are separated to provide a cavity and a protrusion having a proximal end and a distal end, wherein the proximal end is secured to the first panel and the distal end is slidably mounted to the second panel.

The unit may further comprise a laminate of first and second membranes between the first and second panels the membranes being cut and having an application of stop-off material for preventing the adhesion of the membranes to the panels and each other at selected locations, wherein the protrusion is provided by a portion of the second membrane.

Preferably the distal end of the protrusion is slibably mounted between the second panel and the first membrane.

Regions of the first membrane may be rigidly attached to the first panel and regions of the second membrane are rigidly attached to the second panel.

Preferably the first and second panels are separated following assembly into a unit. The first and second panels may be assembled into a unit by a process of diffusion bonding.

Preferably the panels are separated by inserting a gas at high pressure therebetween to inflate the article.

A damping material may be injected into the cavity. Preferably the damping material has viscoelastic properties.

Embodiments of the invention will now be described by way of example only, with reference to the accompanying drawings. Where appropriate features shown in one embodiment may be interchanged with or added to features in another embodiment.

FIG. 3 depicts a pattern of stop-off material and location of cuts on a first surface of a first membrane leaf within the blade of FIG. 1.

FIG. 4 depicts a pattern of stop-off material and location of cuts on a first surface of a second membrane leaf within the blade of FIG. 1.

Figure 1:
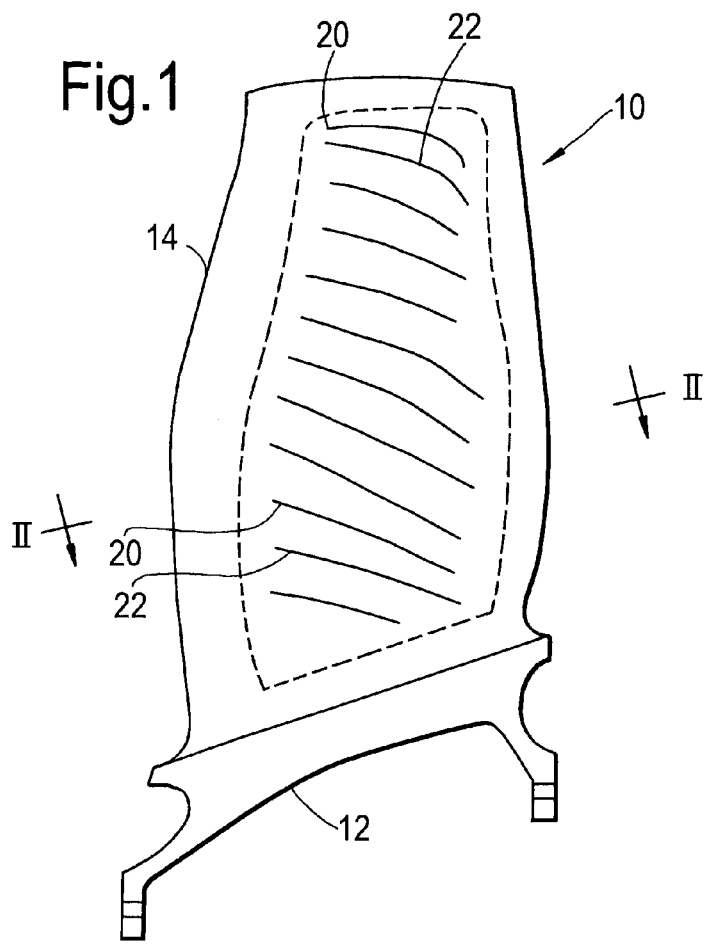
FIG. 1 is a perspective view of disk and blade body for a gas turbine in accordance with the invention.

In FIG. 1, a blisk 10 comprises a disk 12 and fan blade body 14. The blade body comprises first and second panels 16, 18 which are spaced apart to define a void or cavity 19 (FIG. 2) therebetween. Between the first and second panels 16,18 is provided a series of elongate ribs 20,22 respectively extending generally chord-wise across the blade.

The void 19 is filled with a visco-elastic damping material. By way of non limiting example, the damping material may be a Huntsman syntactic damping paste or some such similar product. The damping material is of known composition and acts to inhibit vibration.

Although FIG. 1 shows an exemplary arrangement of ribs it will be appreciated that as the blade rotates the generally parallel nature of the ribs will maximise strength of the tip against impact, e.g. bird strike as well as acting as a dam or barrier to prevent the visco-elastic material 24 from overloading and/or escaping the tip. Other rib configurations are envisaged and could be designed to maximise damping from specific mode shapes.

Each of the ribs is formed from a plurality of discrete fingers or protrusions spaced apart from each other and provided by an interior membrane preferably formed as a laminate of membrane leafs. One end of each finger is rigidly secured to one wall of the blade whilst the other end of the finger is flexibly mounted to the other wall of the blade. The finger resiliently extends between two outer walls of the blade to limit the transfer of vibrations between the walls whilst inhibiting panting of the blade.

Figure 2:
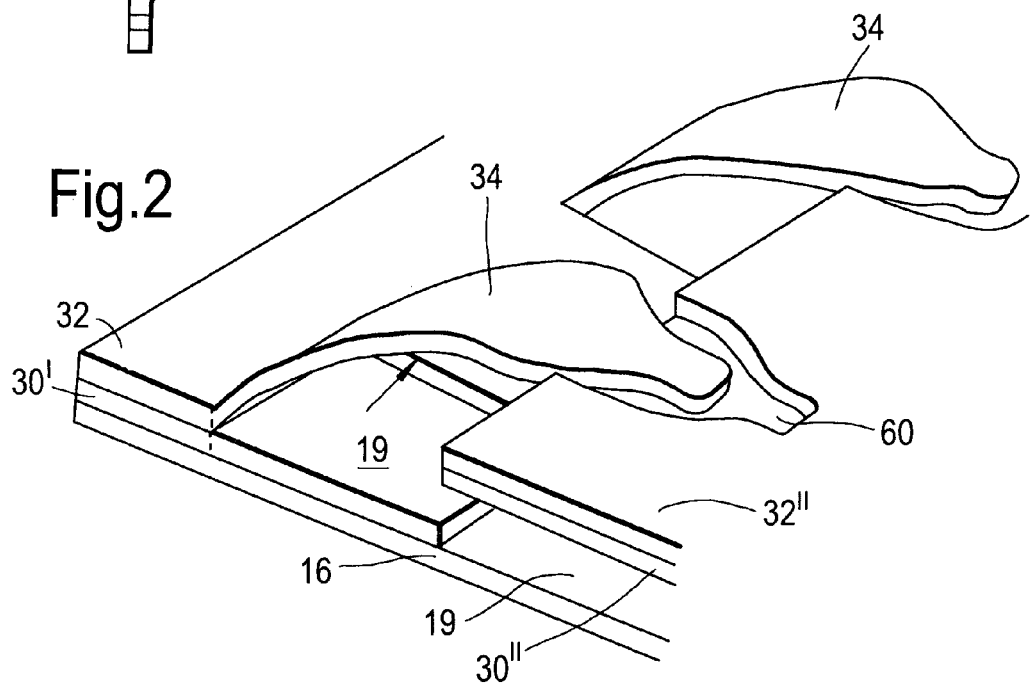
FIG. 2 depicts an exemplary arrangement of protrusions in the blade of FIG. 1

FIG. 2 shows an exemplary finger in one of the rows 20, 22. One wall 18 of the blade 14 has been removed for clarity. This wall would be bonded to portions of the top of the upper membrane leaf 32.

The finger 34 has a proximal and a distal end. The proximal end of the finger is blended into the lower membrane leaf at the lower wall of the aerofoil whilst the distal end is not secured to membrane leaf 32 but slidably secured between the lower membrane leaf 30 and the upper wall of the aerofoil 18. The fingers 34 are defined by cutting out an appropriate shape from the membranes.

The manufacturing method will be described with reference to FIGS. 3 to 7.

A hollow fan blade in accordance with the invention is manufactured through a process of diffusion bonding and super plastic forming. A series of sheets formed of a diffusion bondable titanium alloy are laminated and heated to a temperature where the alloy exhibits superplasticity for a period of time sufficient to join the sheets together.

To avoid the sheets bonding over their whole surface it is known to apply a ceramic yttria coating to selected locations. The coating prevents the sheets bonding where it is applied.

Four sheets are required to manufacture the fingers shown in FIG. 2. The first sheet 16 provides one of the outer walls of the blade. A second sheet 18 provides the opposing outer wall of the blade. Two internal membranes 30, 32 are used to provide the internal structure and are interlaid between the outer walls of the blade. Each sheet has a typical thickness of around 0.5 mm but may have a thickness in excess of 1 mm.

In practice the blade is assembled in a several stage process. The internal membranes 30, 32 are assembled in a first stage and these are then attached to the outer walls before the whole article is diffusion bonded although in certain circumstances it may be desirable to diffusion bond the internal membranes together before they are secured to the outer walls. The bonded article is then inflated to form the hollow cavity and subsequently the hollow cavity is filled with the visco-elastic damping material.

To manufacture the laminated internal membrane a first sheet 30 of titanium alloy is masked and a coating of yttria applied to selected locations. The thickness of the sheet is less than that of the outer walls or panels 16,18 and preferably is of the order 500 µm. FIG. 3 shows appropriate locations of the masking material 38 for the first internal membrane leaf 30 that is intended to be bonded against the first outer wall 16 of the aerofoil. The surface to which the yttria is applied is the surface facing away from the first outer wall 16 with the selected locations corresponding to positions that will ultimately underlie the finger 34. The fingers, which are part of the second sheet of titanium, will therefore be free to lift and separate from the first membrane leaf.

A second membrane leaf 32 is laminated to the first membrane leaf. This second membrane leaf has a thickness similar to the first membrane leaf and, although not strictly necessary to manufacture the fingers of FIG. 2, may have a selectively applied coating of yttria or other masking material applied to the face of the membrane leaf 32 facing the first membrane 30.

As shown in FIG. 4, an yttria coating is desired on the upper surface of the second internal membrane leaf 32 i.e. the surface facing away from the first membrane leaf 30 to permit the finger 34 to be shaped. Although this may be applied to the membrane leaf 32 before the membrane leaf 32 is laminated to the first membrane leaf 30 it is desirable to wait till the membranes have been joined as the first membrane leaf 30 can be used as a datum to ensure that the masking material is applied to the correct location on the second leaf.

However, it will be appreciated that the yttria may be applied over a greater surface area than required to correspond to the fingers in order to improve the manufacturability of the blade. Provided there is a sufficient area of the membranes let uncoated to ensure good adhesion between the membranes and the membranes and the outer walls in the desired locations then the remaining area may be masked by yttria to reduce the requirement to exactly locate the masking material. Manufacturing tolerance is thereby improved.

The inner membranes 30, 32 may be laminated and secured together by either temporary of permanent means. Temporary means include techniques such as clamping or tack welding which are intended to secure the membranes till they are permanently joined by diffusion bonding.

Once the laminate of the two inner membranes 30, 32 is formed each sheet is cut along a different profile. Laser cutting is preferred because it offers a simple, controllable process that offers good accuracy. However, other techniques may be applicable. From the underside of the laminate 30 the laser cuts along lines 40 of FIG. 3 to a depth equal to the depth of the first sheet. The second sheet 32 is uncut. If desired a series of perforations may be made at selected locations rather than a clean cut. The perforations separate when the blade is inflated but are sufficient to maintain the integrity of the laminated membrane before the outer walls are joined.

This cut is intended to separate the lower intermediate membrane leaf 30 into a plurality of segments denoted 30' and 30" in FIG. 2. The first segment 30' is intended to be secured to the outer wall 16 whilst the second segment 30" is intended to be bonded to the upper intermediate membrane leaf 32 which, in turn, is bonded to the other outer wall. In this way, when the blade is later inflated the two segments 30', 30" are separated towards the opposite outer walls of the inflated blade.

The second membrane leaf 32, as shown in FIG. 4, is then cut from the opposite surface of the laminate to form the finger profiles and to divide the membrane into a plurality of segments. It is desirable that the cut depth is equal to the depth of the membrane leaf 32, though a slight cut through into the first membrane leaf may be acceptable provided the whole depth of the first membrane is not cut through. Once again, perforations may be used to maintain the integrity of the laminate before the outer panels are joined. Alternatively, it is possible to cut each membrane leaf separately and laminate them together. The peripheries of the sheets are typically continuous and prevent the cuts causing the membranes from coming apart. Features may be provided to help align the sheets together.

Figure 5:
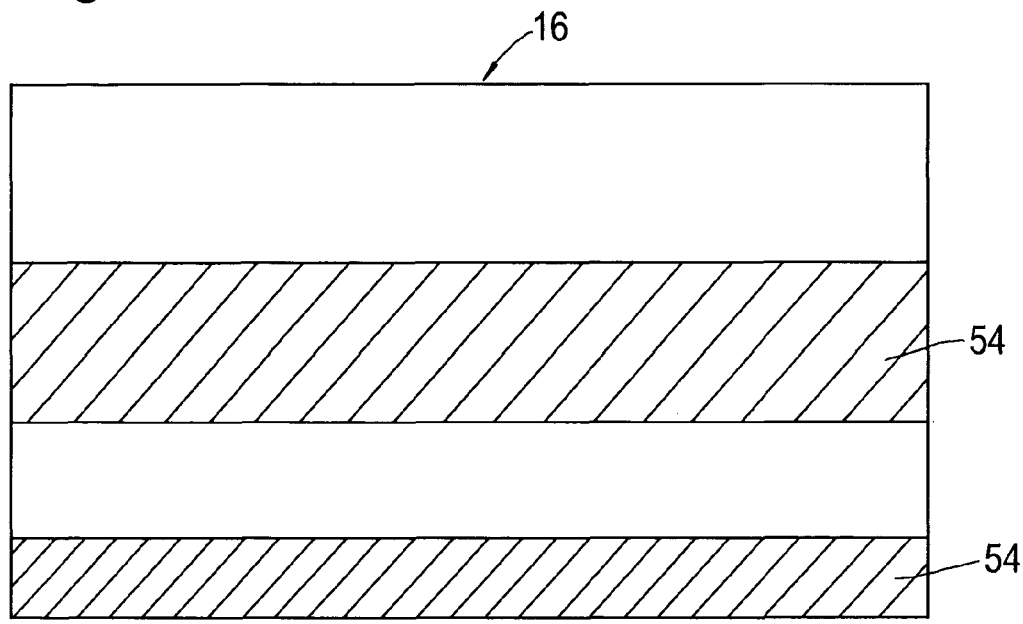
FIG. 5 depicts a pattern of stop-off material and location of cuts on the internal surface of an outer panel of the blade of FIG. 1.

The first outer wall 16 intended to be joined to the first membrane leaf 30 is prepared with a coating of yttria at selected locations as shown in FIG. 5. The locations permit the first leaf to divide on inflation into regions with one region 30' being firmly attached to the outer wall and the other region 30" being pulled by the second membrane leaf 32 to the second outer wall of the article. The region 30" corresponds to the masked and coated areas 54.

Figure 6:
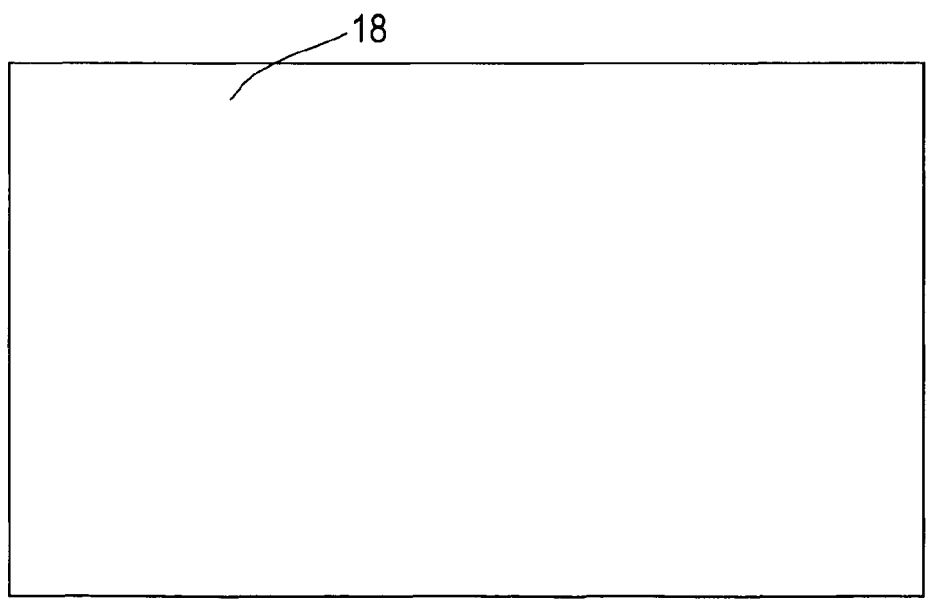
FIG. 6 depicts a pattern of stop-off material and location of cuts on the internal surface of an outer panel of the blade of FIG. 1.
Figure 7:
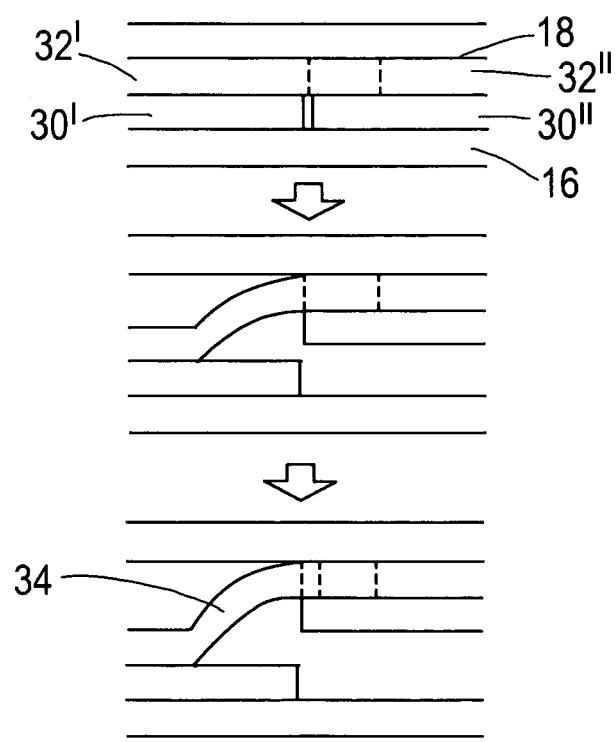
FIG. 7 depicts an inflation procedure of the blade of FIG. 1

The second outer wall, shown in FIG. 6, is laminated directly to the exposed surface of the second inner membrane leaf 32. There is no explicit requirement to apply yttria to the underside of this sheet as yttria is applied to all the necessary locations where it is undesirable to stick the membrane by applying the coating directly to the second internal membrane leaf 32 as discussed with reference to FIG. 4. However, in certain circumstances, it may be desirable to apply the or an additional coating to the outer wall rather than or in addition to the coating on the membrane leaf 32.

Once the four sheet laminate is formed it is diffusion bonded and the resulting diffusion bonded laminate is arranged in a die and subjected to super plastic forming operations. The die and the laminate are subjected to heating to a super plastic temperature for the material in question. Generally the material is titanium which exhibits super plasticity at a temperature around 850° C. Then an inert gas, typically argon, is injected at high pressure into the interior of the blade. At the elevated temperatures the high pressure gas pushes the panels 16, 18 apart stretching and separating the internal membranes. The laminate is allowed to continue to extend by moving apart the panels 16, 18 until the panels contact the surfaces of the opposing die plates.

The blade subassembly is allowed to cool and is arranged in a second die which has opposing surfaces which are formed as a female die formation for the ultimate exterior shape of the panels. The subassembly is then subject to a hot forming process in which, again, the die and the subassembly is heated to a hot forming temperature, for titanium normally around 750° C. The inert gas is injected into the interior of the subassembly at high pressure, around 30 bar. The panels move apart but because the titanium is not at a superplastic temperature the internal fingers do not stretch but instead bend and slide to form spring elements.

The internal pressure is applied until the panels 16, 18 have assumed their final shapes. The fan blade is then removed from the die and cooled.

The inflation process separates portions of the first and second membrane leafs depending on where they are attached to the outer walls. Referring back to FIG. 2, the first inner membrane has been cut into two regions 30', 30". The first section 30' is diffusion bonded to the outer wall 16 and remains attached when the blade is inflated. The second section 30" overlies an yttria coating and is not attached to the outer wall. However, since the second section 30" is diffusion bonded to the second inner membrane 32 which is bonded to the second outer wall 18 inflation of the blade causes the second section to move away from the lower wall 16 to leave a void or cavity 19.

When the blade is inflated the second region 30", 32" moves relative to the first region 30', 32' in a direction perpendicular to the plane of the membranes. The finger is attached at its proximal end to the first region 30',32' and whilst it is not joined at its distal end to the second section 30", 32" the tip of the finger is trapped between the inner membrane leaf 30" and the outer wall 18 and is pulled upwards. The distal end is permitted to slide within the cavity 60 formed between the outer wall and the membrane to reduce stress within the blade. The finger is flexibly mounted to provide a "soft" connection between the two faces as opposed to a rigid connection and this helps to reduce the level of modal cross-talk between the two faces.

The distal tip of the finger has a shaped taper. Initially, before the blade is inflated the tip engages the end of the recess 60. As the blade is inflated using a blow forming or super plastic forming process the tip is retracted from the end of the recess. The disengaged tip is free to slide within the slot in two dimensions i.e. towards or away from the end of the recess or side to side within the recess. It will be appreciated that where only fore and aft movement is required the finger may be provided without a tapered end.

A hole is formed in one of the outer panels and a viscoelastic material introduced in a conventional manner. The material fills the whole of the cavity 19 with the fingers inhibiting radial movement of the damping material when the blade is in use within the gas turbine engine.

The arrangement of the fingers and the spacing between fingers both within the rows and between adjacent rows is determined in part by the visco-elastic material being used within the blade. Each of the fingers and the rows must be spaced from one another a distance that is sufficient to permit the visco-elastic material to flow past them on filling, yet close enough to inhibit flow of the visco-elastic material once the blade is in use.

Once the visco-elastic damping material has been added the hole through which it is inserted is closed.

It will be appreciated that the size and geometry of the blade will also have a bearing on the number of rows of fingers up the blade and their spacing and the number and spacing of the fingers within each row.

The number of fingers within each row may be the same or different and they may be offset from or in line with fingers within adjacent rows depending on design choice.

It has been mentioned earlier in the specification that a coating may be applied to the underside of the second intermediate sheet this is of particular benefit where it is desired to form "reverse fingers", or fingers that have their proximal ends attached to the first intermediate sheet 30 and their distal ends interlocked between the second intermediate sheet 32 and the lower outer wall 16.

Figure 8:
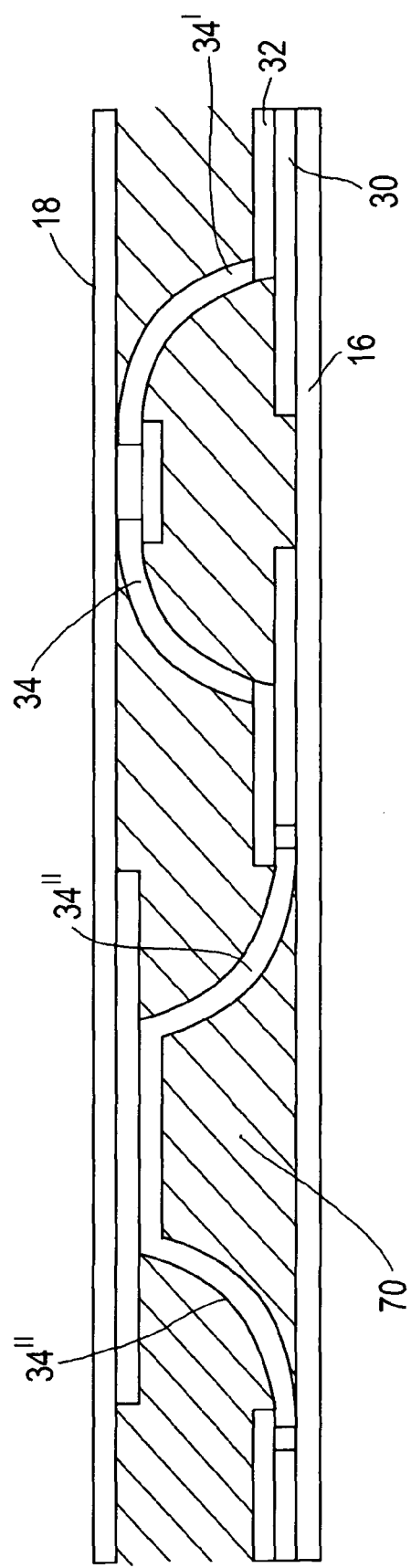
FIG. 8 depicts alternative protrusion/finger arrangements for a blade.

These so-called "reverse fingers" may be arranged to different curve arrangement to the fingers depicted in FIG. 2 leading to a beneficial effect on the retention of the visco-elastic filler. The different curve direction may be arranged to have the concave surface facing in the opposite direction i.e. towards the tip rather than towards the root as shown in FIG. 2. Alternatively, the concave surface of the "reverse fingers" may also face towards the root but, because the secured proximal end is on the opposing wall to the secured proximal end of the normal fingers, the curve arrangement is different. Such an arrangement is shown in FIG. 8 where fingers 34', 34" and 34'" show possible orientations in relation to the finger 34 of FIG. 2. The visco-elastic filler 70 fills the cavity 19.

The panels 16, 18 and the internal membranes may all be titanium, or they may be formed of different materials. In addition, it is possible to form the internal structure using more than two internal membrane leafs with the fingers or protrusions being provided by n–x of the leafs where n is the total number of leafs and x is equal to or less than n−1.

It is also possible to combine the sliding fingers or protrusions in an array with one or more connections that are rigidly secured to both outer walls of the article. Although the rigid connection may increase cross-talk between the panels judicious use of their location may provide beneficial effects such as reduced twisting of the article.

It will be appreciated that the present invention offers a number of significant advantages. For example, the blade is relatively easy to manufacture using known manufacturing processes such as diffusion bonding and super plastic forming. The internal architecture fits into a small cavity geometry and can be manufactured using layers which means there is minimal collapse at the diffusion bonding stage. The internal architecture as described retains visco-elastic material during centrifugal loadings with a good barrier shape. Beneficially, the form pattern can be easily tailored for specific design architecture to provide the optimum internal arrangement.

Although we have described the application of the above invention to a fan blade, it is envisaged that any suitable hollow structure could use the present invention. For example, blades for open-rotor and propeller structures (for example turbo prop, ducted and unducted fans and other turbomachinery) could be manufactured to have similar structures to those described above. The invention may also have application for static aerofoil structures and non-aerofoil components, such as blade containment structures for gas turbine engines.

The invention may also find application in fields away from aerospace for example for components such as hollow manufacturing machinery where the machinery is subject to significant vibration and damping is required.

The invention claimed is:

1. An article for minimizing a transfer of vibrations in an aerofoil blade of a gas turbine engine, the article comprising:
a cavity; and
first and second panels spaced apart from each other with the cavity disposed between the first and second panels, the first panel having at least one bowed protrusion having a proximal end and a distal end, the protrusion extending therefrom within the cavity towards the second panel, and the second panel has at least one pocket, wherein:
the proximal end of the protrusion is secured to the first panel and the distal end of the protrusion is slidably secured in the pocket of the second panel;
the first panel includes an exterior wall and at least one interior membrane leaf, the proximal end of the protrusion being integral with at least one of the interior membrane leaves;
the second panel includes an exterior wall and at least one interior membrane leaf, the pocket being disposed between the exterior wall and at least one of the interior membrane leaves; and
at least one of the interior membrane leaves is metallic.

2. The article according to claim 1, wherein
the membrane leaves are arranged as a laminate having outer surfaces such that each outer surface is rigidly attached to either the first panel or the second panel at one or more regions thereof.

3. The article according to claim 1, wherein
the first and second panels are shaped to present a profile that generates lift from a fluid flowing past the article.

4. The article according to claim 1, wherein
the cavity contains a damping material.

5. The article according to claim 4, wherein
the damping material is a viscoelastic damping material.

6. The article according to claim 1, further comprising:
a plurality of protrusions arranged as at least one array such that the direction in which each array extends provides a barrier for inhibiting a passage of damping material if the cavity contains damping material.

7. An article for minimizing a transfer of vibrations in an aerofoil blade of a gas turbine engine, the article comprising:
a cavity; and
first and second panels spaced apart from each other with the cavity disposed between the first and second panels, the first panel having at least one protrusion having a proximal end and a distal end, the protrusion extending therefrom within the cavity towards the second panel, and the second panel has at least one pocket, wherein:
the proximal end of the protrusion is secured to the first panel and the distal end of the protrusion is tapered and slidably secured in the pocket of the second panel;
the first panel includes an exterior wall and at least one interior membrane leaf, the proximal end of the protrusion being integral with at least one of the interior membrane leaves;
the second panel includes an exterior wall and at least one interior membrane leaf, the pocket being disposed between the exterior wall and at least one of the interior membrane leaves; and
at least one of the interior membrane leaves is metallic.

8. The article according to claim 7, wherein the membrane leaves are arranged as a laminate having outer surfaces such that each outer surface is rigidly attached to either the first panel or the second panel at one or more regions thereof.

9. The article according to claim 7, wherein the first and second panels are shaped to present a profile that generates lift from a fluid flowing past the article.

10. The article according to claim 7, wherein the cavity contains a damping material.

11. The article according to claim 10, wherein the damping material is a viscoelastic damping material.

12. The article according to claim 7, further comprising: a plurality of protrusions arranged as at least one array such that the direction in which each array extends provides a barrier for inhibiting a passage of damping material if the cavity contains damping material.

13. An article for minimizing a transfer of vibrations in an aerofoil blade of a gas turbine engine, the article comprising:
a cavity; and
first and second panels spaced apart from each other with the cavity disposed between the first and second panels, the first panel having at least one protrusion having a proximal end and a distal end, the protrusion extending therefrom within the cavity towards the second panel, and the second panel has at least one pocket, wherein:
the proximal end of the protrusion is secured to the first panel and the distal end of the protrusion is slidably secured in the pocket of the second panel;
the first panel includes an exterior wall and at least one interior membrane leaf, the proximal end of the protrusion being integral with at least one of the interior membrane leaves;
the second panel includes an exterior wall and at least one interior membrane leaf, the pocket being disposed between the exterior wall and at least one of the interior membrane leaves;
at least one of the interior membrane leaves is metallic; and
the distal end of the protrusion is configured to be slidably secured in a direction that is parallel to the first panel.

14. The article according to claim 13, wherein the membrane leaves are arranged as a laminate having outer surfaces such that each outer surface is rigidly attached to either the first panel or the second panel at one or more regions thereof.

15. The article according to claim 13, wherein the first and second panels are shaped to present a profile that generates lift from a fluid flowing past the article.

16. The article according to claim 13, wherein the cavity contains a damping material.

17. The article according to claim 13, further comprising: a plurality of protrusions arranged as at least one array such that the direction in which each array extends provides a barrier for inhibiting a passage of damping material if the cavity contains damping material.

* * * * *